United States Patent Office 3,749,729
Patented July 31, 1973

3,749,729
1,3,4,9b-TETRAHYDRO INDENO[1,2-c]PYRIDINES
Jean-Michel Bastian, Therwil, Anton Ebnother, Arlesheim, and Erwin Rissi, Basel, Switzerland, assignors to Sandoz Ltd. (also known as Sandoz AG), Basel, Switzerland
No Drawing. Filed Jan. 17, 1972, Ser. No. 218,509
Claims priority, application Switzerland, Jan. 21, 1971, 889/71; Jan. 26, 1971, 1,121/71
Int. Cl. C07d 31/48
U.S. Cl. 260—294.8 B      16 Claims

ABSTRACT OF THE DISCLOSURE

The invention concerns pharmaceutically acceptable acid addition salts of new compounds of Formula I,

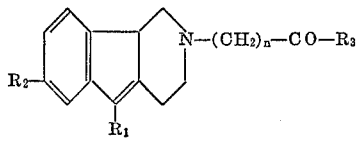

(I)

wherein $R_1$ is hydrogen or methyl,
$R_2$ is hydrogen, or, when $R_1$ is hydrogen, hydrogen, methyl or ethyl,
$n$ is 2, or, when $R_1$ is methyl, 1, 2, 3 or 4, and when $R_1$ is hydrogen, $R_3$ is alkyl of 1 to 5 carbon atoms, cycloalkyl of 3 to 7 carbon atoms, phenyl, or phenyl mono- or disubstituted by fluorine, chlorine, bromine, methoxy or alkyl of 1 to 4 carbon atoms, or, when $R_1$ is methyl, $R_3$ is an

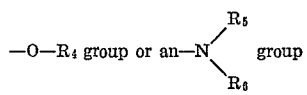

wherein $R_4$ is alkyl of 1 to 5 carbon atoms, phenyl or phenylalkyl, wherein the alkyl radical is of 1 to 4 carbon atoms, and each of
$R_5$ and $R_6$ is hydrogen, alkyl of 1 to 5 carbon atoms, cycloalkyl of 3 to 7 carbon atoms, phenyl or phenylalkyl, wherein the alkyl radical is of 1 to 4 carbon atoms, or
$R_5$ and $R_6$ together with the nitrogen atom form a saturated 5- or 6-membered heterocyclic ring, the heterocycle being selected from heterocycles containing 1 nitrogen atom, 1 nitrogen atom and 1 oxygen atom, and 1 nitrogen atom and a further nitrogen atom substituted by an alkyl radical of 1 to 4 carbon atoms.

When $R_1$ is methyl, the compounds of Formula I can also be in free base form.

Processes for the production of said compounds as well as intermediates therefor are described.

The compounds are useful anti-aggressives and are furthermore useful in the treatment of excitation conditions, as indicated by their depressive effect on the central nervous system.

This invention relates to novel indenopyridine derivatives.

In accordance with this invention there are provided acid addition salts of new compounds of Formula I,

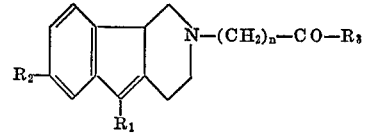

(I)

wherein $R_1$ is hydrogen or methyl,
$R_2$ is hydrogen, or, when $R_1$ is hydrogen, hydrogen, methyl or ethyl,
$n$ is 2, or, when $R_1$ is methyl, 1, 2, 3 or 4, and when $R_1$ is hydrogen, $R_3$ is alkyl of 1 to 5 carbon atoms, cycloalkyl of 3 to 7 carbon atoms, phenyl, or phenyl mono- or disubstituted by fluorine, chlorine, bromine, methoxy or alkyl of 1 to 4 carbon atoms, or, when $R_1$ is methyl, $R_3$ is an —O—$R_4$ group, wherein $R_4$ is alkyl of 1 to 5 carbon atoms, phenyl or phenylalkyl, wherein the alkyl radical is of 1 to 4 carbon atoms, or

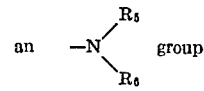

wherein each of $R_5$ and $R_6$ is hydrogen, alkyl of 1 to 5 carbon atoms, cycloalkyl of 3 to 7 carbon atoms, phenyl or phenylalkyl, wherein the alkyl radical is of 1 to 4 carbon atoms, or
$R_5$ and $R_6$ together with the nitrogen atom form a saturated 5- or 6-membered heterocyclic ring, the heterocycle being selected from heterocycles containing 1 nitrogen atom, 1 nitrogen atom and 1 oxygen atom, and 1 nitrogen atom and a further nitrogen atom substituted by an alkyl radical of 1 to 4 carbon atoms, and the compounds of Formula I, wherein $R_1$ is methyl, in free base form.

Further, in accordance with the invention a compound of Formula I may be obtained by a process comprising (a) Preparing an acid addition salt of a compound of Formula Ia,

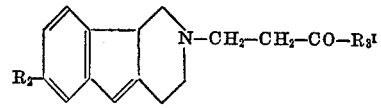

(Ia)

wherein $R_2$ is as defined above, and
$R_3^I$ is alkyl of 1 to 5 carbon atoms, cycloalkyl of 3 to 7 carbon atoms, phenyl, or phenyl mono- or disubstituted by fluorine, chlorine, bromine, methoxy or alkyl of 1 to 4 carbon atoms, by removing water from a compound of Formula II,

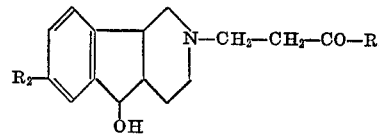

(II)

wherein $R_2$ and $R_3^I$ are as defined above, and simultaneously converting the resulting compound of Formula Ia into acid addition salt form, (b) Preparing a compound of Formula Ib,

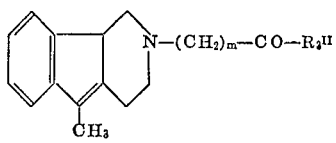

wherein m is 1, 2, 3 or 4, and
$R_3^{II}$ is an —O—$R_4$ group, wherein
  $R_4$ is as defined above,

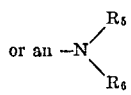

wherein $R_5$ and $R_6$ are as defined above, by reacting the compound of Formula III

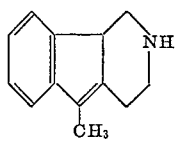

with a compound of Formula IV,

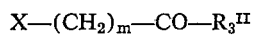

wherein m and $R_3^{II}$ are as defined above, and
X is the acid radical of a reactive ester, and, if desired, converting the resulting compound of Formula Ib into acid addition salt form, or (c) Preparing a compound of Ic,

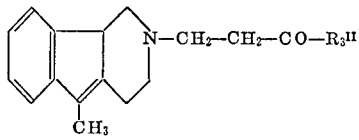

wherein $R_3^{II}$ is as defined above, by reacting the compound of Formula III with a vinylcarbonyl derivative of Formula V,

wherein $R_3^{II}$ is as defined above, and, if desired, converting the resulting compound of Formula Ic into acid addition salt form.

When $R_4$, $R_5$ and $R_6$ denote alkyl radicals, these preferably signify the ethyl or tert.butyl radical.

When $R_5$ and $R_6$ together with the nitrogen atom form a heterocycle, this is preferably the piperidine, pyrrolidine, N'(lower)alkylpiperazine or morpholine ring.

The compounds of Formula Ia are stable in the form of their acid addition salts. In the form of free bases, however, a rearrangement occurs with a shifting of the double bond from the 4a,5 to the 4a,9b position. Therefore, the removal of water in accordance with process(a) is preferably effected with strong acids which yield crystalline salts with the compounds of Formula Ia, or with the chlorides, bromides or iodides of strong acids, the reaction products of which, formed during water removal, yield crystalline salts with the compounds of Formula Ia.

Examples of suitable strong acids for water removal are mineral acids (e.g. in aqueous or alcoholic solution), such as hydrochloric acid, hydrogen bromide, hydrogen iodide or sulphuric acid, or organic acids such as trichloroacetic acid, or organic sulphonic acids, such as methanesulphonic acid, benzenesulphonic acid or naphthalene-1,5-disulphonic acid. Examples of acid halides which may be used are thionyl chloride, phosphorus oxychloride and methanesulphochloride.

The removal of water may, for example, be effected by treating a hydroxy compound of Formula II, as free base or in the form of an acid addition salt thereof, e.g. as hydrochloride, optionally in an inert solvent, with a strong acid or a chloride, bromide or iodide of a strong acid, at a temperature from room temperature to the boiling temperature of the reaction mixture. Reaction times may be from approximately one minute to 24 hours, under preferred conditions 15 minutes to two hours. The reaction mixture is suitably subsequently evaporated to dryness, and the resulting acid addition salt of the compound of Formula Ia may be purified in known manner.

Process (b) for the production of compounds of Formula Ib may, for example, be effected by reacting the compound of Formula III, in free base or acid addition salt form, with a compound of Formula IV, wherein X preferably signifies chlorine, bromine, the methyl- or p-toluenesulphonic acid radical, preferably in an inert solvent, e.g. in an aromatic hydrocarbon such as toluene or benzene, or in a chlorinated hydrocarbon such as chloroform or carbon tetrachloride, or in a di(lower)alkyl amide of a lower carboxylic acid, such as dimethyl formamide, or a lower alcohol. The reaction may be carried out in the presence of an acid-binding agent, e.g. an alkali metal carbonate such as sodium or potassium carbonate, or a tertiary base such as triethylamine, or an excess of the compound of Formula III. A suitable reaction temperature is from 50° C. to the boiling temperature of the reaction mixture.

Process (c) may, for example, be effected by reacting the compound of Formula III, in free base or acid addition salt form, with a compound of Formula V in an inert solvent, e.g. a lower alcohol such as ethanol. A suitable reaction temperature is from 20° C. to the boiling temperature of the reaction mixture. The reaction is conveniently effected in the presence of a catalytic amount of a strong basic condensation agent, e.g. benzyl trimethyl ammonium hydroxide.

The free base forms of the compounds of Formula Ib may be converted into acid addition salts, and acid addition salts into free base forms, in conventional manner.

The compounds of Formula II, used as starting materials, may, for example, be obtained as follows. For example, a compound of Formula VI,

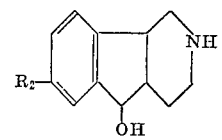

wherein $R_2$ is as defined above,
may be reacted with a compound of Formula VII,

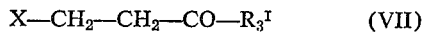

wherein $R_3^I$ and X are as defined above, in a manner analogous to that described for process (b), or with a vinylketone derivative of Formula VIII,

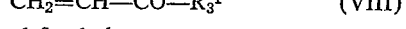

wherein $R_3^I$ is as defined above, in a manner analogous to that described for process (c).

Insofar as the production of the starting materials is not described, the compounds are known or may be prepared by known processes, or in a manner analogous to the processes described herein or to known processes.

The compounds of Formula I or their salts have hitherto not been described in the literature. They exhibit interesting pharmacodynamic properties and are therefore indicated for use as medicaments.

The compounds of Formula I or pharmaceutically acceptable acid addition salts thereof are useful because they possess pharmacological activity in animals. In particular, the compounds are useful anti-aggressives, as indicated by the isolation-induced aggression test in mice upon intraperitoneal administration of 0.1 mg./kg. to 3 mg./kg. of the compounds.

For the above-mentioned use, the dosage administered will, of course, vary depending upon the compound employed, mode of administration and treatment desired. However, in general, satisfactory results are obtained when administered at a daily dosage of from 0.1 to 3 mg./kg. animal body weight, preferably given in divided doses 2 to 3 times a day, or in sustained release form. For the larger mammals, the total daily dosage is in the range of from about 10 to about 80 mg., and dosage forms suitable for oral administration comprise from about 3.3 to about 40 mg. of the compound admixed with a solid or liquid pharmaceutical carrier or diluent.

The compounds of Formula I or pharmaceutically acceptable acid addition salts thereof are furthermore useful in the treatment and prophylaxis of excitation conditions, as indicated by the depressive effect which they exhibit on the central nervous system, such as shown in the standard light barrier motility test in mice upon intraperitoneal administration of 1 mg./kg. to 30 mg./kg. of the compounds. For such use, the dosage administered will, of course, vary depending upon the compound employed, mode of administration and treatment desired. However, in general, satisfactory results are obtained when administered at a daily dosage of from about 1 to about 30 mg./kg. animal body weight, preferably given in divided doses 2 to 3 times a day, or in sustained release form. For the larger mammals, the total daily dosage is in the range of from about 50 to about 150 mg., and dosage forms suitable for oral administration comprise from about 15 to about 75 mg. of the compound admixed with a solid or liquid pharmaceutical carried or diluent.

Compounds having particularly interesting anti-aggressive properties are:

p-fluoro-3-(1,3,4,9b-tetrahydro-2H-indeno[1,2-c]pyridin-2-yl)propiophenone hydrochloride,
3-(1,3,4,9b-tetrahydro-2H-indeno[1,2-c]pyridin-2-yl)-p-methoxypropiophenone hydrochloride and
5-methyl-1,3,4,9b-tetrahydro-2H-indeno[1,2-c]pyridine-2-propionic acid ethyl ester.

The compounds of Formula I may be administered in pharmaceutically acceptable acid addition salt form. Suitable such salt forms include mineral acid salts, such as the hydrochloride, hydrobromide and sulphate, and organic acid salts, such as the methane- and benzenesulphonate.

The invention also provides a pharmaceutical composition comprising as active agent a compound of Formula I in pharmaceutically acceptable acid addition salt form, or a compound of Formula I in which $R_1$ is methyl in free base form, in association with a pharmaceutical carrier or diluent. The pharmaceutical composition may be in standard pharmaceutical form, such as a capsule.

In the following non-limitative examples all temperatures are indicated in degrees centigrade.

EXAMPLE 1

3-(1,3,4,9b-tetrahydro-2H-indeno[1,2-c]pyridin-2-yl)propiophenone hydrochloride [process variant (a)]

10 g. of (1,3,4,4a,5,9b - hexahydro - 5-hydroxy-2H-indeno[1,2-c]pyridin - 2-yl)propiophenone hydrochloride are heated under reflux for 30 minutes with 100 cc. of 2 N hydrochloric acid. The title compound crystallizes upon cooling. It is filtered off and recrystallized from ethanol. Sintering from 190°, decomposition over 250°.

The starting material is produced as follows:

22.5 g. of 1,3,4,4a,5,9b - hexahydro - 5(2H)-indeno[1,2-c]pyridinol hydrochloride, 15 g. of paraformaldehyde, 15.6 g. of acetophenone and 1 cc. of hydrochloric acid in ethanol are heated under reflux in 300 cc. of ethanol for 27 hours. The solution is subsequently concentrated by evaporation in a vacuum and the residue is triturated with acetone, whereby (1,3,4,4a,5,9b-hexahydro - 5 - hydroxy - 2H - indeno[1,2-c]pyridin-2-yl) propiophenone crystallizes. It is recrystallized from ethanol/acetone. M.P. 127–130° (decomp.).

EXAMPLE 2

5 - (1,3,4,9b - tetrahydro-2H-indeno[1,2-c]pyridin-2-yl)-2,2-dimethyl-3-pentanone hydrochloride [process variant (a)]

7 g. of 5 - (1,3,4,4a,5,9b - hexahydro-5-hydroxy-2H-indeno[1,2-c]pyridin - 2-yl)-2,2-dimethyl-3-pentanone are heated under reflux with 70 cc. of 2 N hydrochloric acid for 20 minutes. The title compound has a M.P. over 280° (decomp.) after recrystallization from dilute hydrochloric acid.

Starting material: 5-(1,3,4,4a,5,9b-hexahydro - 5 - hydroxy - 2H - indeno[1,2-c]pyridin-2-yl)-2,2-dimethyl-3-pentanone, M.P. 118–119°.

Production: 11.3 g. of 1,3,4,4a,5,9b-hexahydro-5(2H)-indeno[1,2-c]pyridinol hydrochloride, 7.5 g. of paraformaldehyde, 6.5 g. of pinacoline and 0.2 cc. of hydrochloric acid in ethanol are boiled at reflux in 150 cc. of ethanol. 3 g. of paraformaldehyde are added after 8 hours and also after 24 hours. After 48 hours the product is separated as hydrochloride, and after conversion into free base form, is purified by filtration over a silica gel column.

EXAMPLE 3

4-(1,3,4,9b-tetrahydro-2H-indeno[1,2-c]pyridin-2-yl)-2-butanone hydrochloride [process variant (a)]

10 g. of 4-(1,3,4,4a,5,9b-hexahydro-5-hydroxy-2H-indeno[1,2-c]pyridin-2-yl)-2-butanone are boiled at reflux with 100 cc. of 2 N hydrochloric acid for 20 minutes. The title compound has a M.P. of 286–292° (decomp.) after recrystallization from isopropanol.

The starting material is produced as follows:

21.8 cc. of methylvinylketone are added dropwise at 70° over a period of 10 minutes to a solution of 25 g. of 1,3,4,4a,5,9b-hexahydro-5(2H)-indeno[1,2-c]pyridinol in 250 cc. of ethanol. The reaction solution is boiled under reflux for 30 minutes, is then concentrated by evaporation in a vacuum and the residue is recrystallized twice from isopropanol/pentane. 4-(1,3,4,4a,5,9b-hexahydro-5-hydroxy-2H-indeno[1,2-c]pyridin-2-yl)-2-butanone has a M.P. of 77–79°.

EXAMPLE 4

5-(1,3,4,9b-tetrahydro-2H-indeno[1,2-c]pyridin-2-yl)-3-pentanone hydrochloride [process variant (a)]

The title compound is obtained in accordance with the process described in Example 3 from 5-(1,3,4,4a,5,9b-hexahydro-5-hydroxy - 2H - indeno[1,2-c]pyridin-2-yl)-3-pentanone. M.P. 170–172° after crystallization from methanol/acetone.

Starting material: 5-(1,3,4,4a,5,9b-hexahydro - 5 - hydroxy-2H-indeno[1,2 - c]pyridin-2-yl)-3-pentanone. M.P. 85–86° after crystallization from ether/pentane.

EXAMPLE 5 p-Fluoro-3-(1,3,4,9b-tetrahydro - 2H - indeno[-1,2-c]pyridin-2-yl)propiophenone hydrochloride [process variant (a)]

8.25 g. of p-fluoro - 3 - (1,3,4,4a,5,9b-hexahydro-5-hydroxy-2H-indeno[1,2 - c]pyridin-2-yl)propiophenone are heated under reflux with 160 cc. of 2 N hydrochloric acid for 30 minutes. The title compound has a M.P. of 291–293° (decomp.) after recrystallization from ethanol.

Starting material: p-Fluoro-3-(1,3,4,4a,5,9b-hexahydro-5-hydroxy-2H-indeno[1,2 - c]pyridin-2-yl)propiophenone, M.P. 147–148° from acetone/ether.

Production: In a manner analogous to that described in Example 2 from 11.3 g. of 1,3,4,4a,5,9b-hexahydro-5(2H)-indeno[1,2-c]pyridinol hydrochloride, 7.8 g. of p- fluoro-acetophenone and twice 6.3 g. of paraformaldehyde. Total reaction period 42 hours.

EXAMPLE 6 p-Chloro-3-(1,3,4,9b-tetrahydro - 2H - indeno[1,2-c]pyridin-2-yl)propiophenone hydrochloride [process variant (a)]

p - Chloro-3-(1,3,4,4a,5,9b-hexahydro-5-hydroxy-2H-indeno[1,2-c]pyridin-2-yl)propiophenone is reacted in accordance with the process described in Example 5. The title compound has a M.P. of 285–290°.

EXAMPLE 7

3-(1,3,4-9b-tetrahydro-2H-indeno[1,2 - c]pyridin-2-yl)-p-methylpropiophenone hydrochloride [process variant (a)]

3 - (1,3,4,4a,5,9b-hexahydro - 5 - hydroxy-2H-indeno-[1,2-c]pyridin-2-yl)-p-methylpropiophenone is reacted in accordance with the process described in Example 5. The title compound has a M.P. of 288–293°.

EXAMPLE 8

3-(1,3,4,9b-tetrahydro-2H-indeno[1,2 - c]pyridin-2-yl)-p-methoxypropiophenone hydrochloride [process variant (a)]

3 - (1,3,4,4a,5,9b-hexahydro - 5 - hydroxy-2H-indeno [1,2-c]pyridin-2-yl)-p-methoxypropiophenone is reacted in accordance with the process described in Example 5. The title compound has a M.P. of 214–216°.

EXAMPLE 9

1 - cyclopentyl-3-(1,3,4,9b-tetrahydro - 2H - indeno[1,2-c]pyridin-2-yl)-1-propanone hydrochloride [process variant (a)]

14.0 g. of 1-cyclopentyl-3-(1,3,4,4a,5,9b-hexahydro-5-hydroxy-2H-indeno[1,2-c]pyridin-2-yl)-1-propanone are heated under reflux with 280 cc. of 2 N hydrochloric acid for 30 minutes. The title compound has a M.P. of 293–295° from ethanol/water.

The starting material is produced as follows:

12 g. of 1,3,4,4a,5,9b-hexahydro-5(2H)-indeno[1,2-c] pyridinol, 12.2 g. of β-chloroethyl-cyclopentylketone and 13.5 g. of sodium carbonate are heated to 100° in 100 cc. of dimethyl formamide for 15 hours while stirring. After cooling, filtration is effected and the filtrate is concentrated by evaporation. The residue is taken up in water, is extracted with chloroform and the chloroform solution is concentrated by evaporation. 1-cyclopentyl-3-(1,3,4,4a,5,9b-hexahydro - 5 - hydroxy-2H-indeno[1,2-c] pyridin-2-yl)-1-propanone is recrystallized from ether. M.P. 103–104°.

EXAMPLE 10

4-(1,3,4,9b-tetrahydro-7-methyl-2H-indeno[1,2-c]pyridin-2-yl)-2-butanone hydrochloride [process variant (a)]

4.7 g. of 4-(1,3,4,4a,5,9b-hexahydro-5-hydroxy-7-methyl-2H-indeno[1,2-c]pyridin-2-yl)-2-butanone are boiled under reflux with 50 cc. of 2 N hydrochloric acid for 20 minutes. The title compound has a M.P. of 262–265° from ethanol.

The starting material is produced as follows:

A solution of 5.0 g. of 1,3,4,4a,5,9b-hexahydro-7-methyl-5(2H)-indeno[1,2-c]pyridinol and 4.1 cc. of methylvinylketone in 55 cc. of ethanol is boiled under reflux for 1 hour and is then concentrated by evaporation. 4-(1,3,4, 4a,5,9b-hexahydro-5-hydroxy-7-methyl-2H-indeno[1,2 - c] pyridin-2-yl)-2-butanone is recrystallized from isopropanol. M.P. 130–131°.

EXAMPLE 11

3-(1,3,4,9b-tetrahydro-2H-indeno[1,2-c]pyridin - 2 - yl)-m - methylpropiophenone hydrochloride [process variant (a)]

8.25 g. of 3-(1,3,4,9b-hexahydro-5-hydroxy-2H-indeno-[1,2-c]pyridin-2-yl)-m - methylpropiophenone (produced in a manner analogous to that described in Example 5; M.P. 99–102°) are heated at reflux with 160 cc. of 2 N hydrochloric acid for 30 minutes. M.P. of the title compound 270° (sintering from 190°) after recrystallization from ethanol.

EXAMPLE 12

3-(1,3,4,9b-tetrahydro-2H-indeno[1,2-c]pyridin - 2 - yl)-m-methoxypropiophenone hydrochloride [process variant (a)]

3-(1,3,4,4a,5,9b-hexahydro - 5 - hydroxy - 2H - indeno-[1,2-c]pyridin-2-yl)-m-methoxypropiophenone (produced in a manner analogous to that described in Example 5; M.P. of the hydrochloride 169°) is reacted in accordance with the process described in Example 1. M.P. of the title compound 185–189° (decomp.).

EXAMPLE 13

3-(1,3,4,9b-tetrahydro-2H-indeno[1,2-c]pyridin - 2 - yl)-o-methoxypropiophenone hydrochloride [process variant (a)]

3-(1,3,4,4a,5,9b-hexahydro - 5 - hydroxy - 2H - indeno-[1,2-c]pyridin - 2 - yl) - o - methoxypropiophenone (M.P. of the naphthalene disulphonate 201–202°) is reacted in accordance with the process described in Example 1. M.P. of the title compound 165–168° (decomp.).

EXAMPLE 14

3-(1,3,4,9b-tetrahydro-2H-indeno[1,2-c]pyridin - 2 - yl)-m,p - dimethoxypropiophenone hydrochloride [process variant (a)]

3-(1,3,4,4a,5,9b-hexahydro - 5 - hydroxy - 2H - indeno-[1,2-c]pyridin-2-yl)-m,p-dimethoxypropiophenone (M.P. of the hydrochloride 203–205°) is reacted in accordance with the process described in Example 1. M.P. of the title compound 265–267° (decomp.).

EXAMPLE 15

3-(1,3,4,9b-tetrahydro-2H-indeno[1,2-c]pyridin - 2 - yl)-o,p - dimethoxypropiophenone hydrochloride [process variant (a)]

3-(1,3,4,4a,5,9b-hexahydro - 5 - hydroxy - 2H - indeno-[1,2 - c]pyridin-2-yl)-o,p-dimethoxypropiophenone (M.P. 126–128°) is reacted in accordance with the process described in Example 1. M.P. of the title compound 164–167° (decomp.).

EXAMPLE 16

1,3,4,9b-tetrahydro-5-methyl-2H-indeno[1,2-c]pyridine-2-acetic acid methyl ester [process variant (b)]

A solution of 15.3 g. of bromoacetic acid methyl ester in 50 cc. of dimethyl formamide is added dropwise at 60° while stirring to a mixture of 18.5 g. of 1,3,4,9b-tetrahydro-5-methyl-2H-indeno[1,2-c]pyridine and 41.4 g. of potassium carbonate in 200 c. of dimethyl formamide. The reaction mixture is allowed to react at 60° for 1 hour, is poured on ice water and is extracted thrice with chloroform. The extracts are dried and completely concentrated by evaporation, the residue is dissolved in 50 cc. of methanol, and the calculated amount of hydrochloric acid in ethanol is added. After the addition of ether, 1,3,4,9b-tetrahydro-5-methyl-2H-indeno[1,2-c]pyridine - 2 - acetic acid methyl ester crystallizes as hydrochloride and is recrystallized twice from ethanol for further purification. The hydrochloride has a M.P. of 184–185°.

EXAMPLE 17

4-(1,3,4,9b-tetrahydro-5-methyl-2H-indeno[1,2-c]pyridin-2-yl) butyric acid ethyl ester [process variant (b)]

1,3,4,9b-tetrahydro-5-methyl - 2H - indeno[1,2-c]pyridine and 4-bromobutyric acid ethyl ester are reacted in accordance with the process described in Example 16. The hydrochloride of the title compound has a M.P. of 186–188° from ethanol/acetone.

EXAMPLE 18

5-(1,3,4,9b-tetrahydro-5-methyl-2H-indeno[1,2-c]pyridin-2-yl) valeric acid amide [process variant (b)]

1,3,4,9b-tetrahydro-5-methyl - 2H - indeno[1,2-c]pyridine and 5-chlorovaleric acid amide are reacted in accordance with the process described in Example 16. Reaction period 19 hours at 60°. The hydrochloride of the title compound has a M.P. of 194–196° from ethanol.

EXAMPLE 19

1,3,4,9b-tetrahydro-5-methyl-2H-indeno[1,2-c]pyridine acetamide [process variant (b)]

1,3,4,9b-tetrahydro-5-methyl - 2H - indeno[1,2-c]pyridine and chloroacetamide are reacted in accordance with the process described in Example 16. Reaction period four hours at 60°. M.P. of the title compound 167–168° from acetone.

EXAMPLE 20

3-(1,3,4,9b-tetrahydro-5-methyl-2H-indeno[1,2-c]pyridin-2-yl) propionic acid ethyl ester [process variant (c)]

A mixture of 12.5 g. of 1,3,4,9b-tetrahydro-5-methyl-2H-indeno[1,2-c]pyridine and 8.8 cc. of acrylic acid ethyl ester is heated to 80° in 100 cc. of ethanol for 3 hours, and is subsequently evaporated to dryness. The residue is distilled in a high vacuum, whereby the title compound distils over at 161–165°/0.1 mm. of Hg.

The base is converted into the hydrochloride by dissolving the distillate in ethanol and adding the calculated amount of hydrochloric acid in ethanol. The resulting crude hydrochloride is again recrystallized from ethanol. M.P. 183–184° (decomp.).

EXAMPLE 21

3-(1,3,4,9b-tetrahydro-5-methyl-2H-indeno[1,2-c]pyridin-2-yl) propionic acid amide [process variant (c)]

A mixture of 18.5 g. of 1,3,4,9b-tetrahydro-5-methyl-2H-indeno[1,2-c]pyridine and 7.1 g. of acrylamide in 250 cc. of ethanol is boiled at reflux for 6 hours. The reaction mixture is evaporated to dryness, and the resulting title compound is recrystallized from ethanol. M.P. 169–170°.

EXAMPLE 22

3-(1,3,4,9b-tetrahydro-5-methyl-2H-indeno[1,2-c]pyridin-2-y)-N-methylpropionic acid amide [process variant (c)]

1,3,4,9b-tetrahydro-5-methyl - 2H - indeno[1,2-c]pyridine and N-methyl acrylamide are reacted in accordance with the process described in Example 21. Reaction period 15 hours. M.P. of the hydrochloride of the title compound 200–201° from ethanol.

EXAMPLE 23

3-(1,3,4,9b-tetrahydro-5-methyl-2H-indeno[1,2-c]pyridin-2-yl)-N,N-dimethylpropionic acid amide [process variant (c)]

1,3,4,9b-tetrahydro-5-methyl - 2H - indeno[1,2-c]pyridine and N,N-dimethyl acrylamide are reacted in accordance with the process described in Example 21. Reaction period 7 hours. M.P. of the hydrochloride of the title compound 219–221° from ethanol.

EXAMPLE 24

3-(1,3,4,9b-tetrahydro-5-methyl-2H-indeno[1,2-c]pyridin-2-yl)-N-propylpropionic acid amide [process variant (c)]

1,3,4,9b-tetrahydro-5-methyl - 2H - indeno[1,2-c]pyridine and N-propyl acrylamide are reacted in accordance with the process described in Example 21. Reaction period 20 hours. M.P. of the hydrochloride of the title compound 196–197° from ethanol (decomp.).

EXAMPLE 25

N-n-butyl-3-(1,3,4,9b-tetrahydro - 5 - methyl-2H-indeno[1,2-c]pyridin-2-yl) propionic acid amide [process variant (c)]

1,3,4,9b-tetrahydro - 5 - methyl-2H-indeno[1,2-c]pyridine and N-n-butyl acrylamide are reacted in accordance with the process described in Example 21. Reaction period 14 hours. M.P. of the hydrochloride of the title compound 193–194° from ethanol (decomp.).

EXAMPLE 26

N-cyclohexyl-3-(1,3,4,9b - tetrahydro-5-methyl-2H-indeno[1,2-c]pyridin-2-yl) propionic acid amide [process variant (c)]

1,3,4,9b-tetrahydro - 5 - methyl-2H-indeno[1,2-c]pyridine and N-cyclohexyl acrylamide are reacted in accordance with the process described in Example 21. Reaction period 8 hours. M.P. of the title compound 162.5–163.5° from acetone.

EXAMPLE 27

3-(1,3,4,9b-tetrahydro-5-methyl-2H-indeno[1,2-c]pyridin-2-yl) propionic acid piperidine [process variant (c)]

1,3,4,9b-tetrahydro - 5 - methyl-2H-indeno[1,2-c]pyridine and acrylic acid piperidide are reacted in accordance with the process described in Example 21. Reaction period nine hours. M.P. of the hydrochloride of the title compound 219–221° from ethanol (decomp.).

EXAMPLE 28

N-benzyl-3-(1,3,4,9b-tetrahydro - 5 - methyl-2H-indeno[1,2-c]pyridin-2-yl) propionic acid amide [process variant (c)]

1,3,4,9b-tetrahydro - 5 - methyl-2H-indeno[1,2-c]pyridine and N-benzyl acrylamide are reacted in accordance with the process described in Example 21. Reaction period 8 hours. M.P. of the hydrochloride of the title compound 211–212.5° from ethanol (decomp.).

EXAMPLE 29

3-(1,3,4,9b-tetrahydro-5-methyl-2H-indeno[1,2-c]pyridin-2-yl)-N-phenylpropionic acid amide [process variant (c)]

1,3,4,9b-tetrahydro - 5 - methyl-2H-indeno[1,2-c]pyridine and N-phenyl acrylamide are reacted in accordance with the process described in Example 21. Reaction period four hours. M.P. of the hydrochloride of the title compound 207–209° from 95% ethanol.

What is claimed is:

1. A pharmaceutically acceptable acid addition salt of an indenopyridine derivative of the formula:

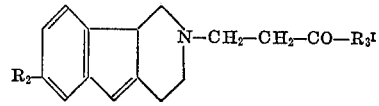

wherein $R_2$ is hydrogen, methyl or ethyl, and
$R_3^I$ is alkyl of 1 to 5 carbon atoms, cycloalkyl of 3 to 7 carbon atoms, phenyl, or phenyl mono- or disubstituted by fluorine, chlorine, bromine, methoxy or alkyl of 1 to 4 carbon aotms.

2. The compound of claim 1, which is a pharmaceutically acceptable acid addition salt of 3-(1,3,4,9b-tetrahydro-2H-indeno[1,2-c]pyridin-2-yl)propiophenone.

3. The compound of claim 1, which is a pharmaceutically acceptable acid addition salt of 5-(1,3,4,9b-tetrahydro-2H-indeno[1,2-c]pyridin-2-yl) - 2,2 - dimethyl-3-pentanone.

4. The compound of claim 1, which is a pharmaceutically acceptable acid addition salt of 4-(1,3,4,9b-tetrahydro-2H-indeno[1,2-c]pyridin-2-yl)-2-butanone.

5. The compound of claim 1, which is a pharmaceutically acceptable acid addition salt of 5-(1,3,4,9b-tetrahydro-2H-indeno[1,2-c]pyridin-2-yl)-3-pentanone.

6. The compound of claim 1, which is a pharmaceutically acceptable acid addition salt of p-fluoro-3-(1,3,4,9b-tetrahydro-2H-indeno[1,2-c]pyridin-2-yl)propiophenone.

7. The compound of claim 1, which is a pharmaceutically acceptable acid addition salt of p-chloro-3-(1,3,4,9b-tetrahydro-2H-indeno[1,2-c]pyridin-2-yl)propiophenone.

8. The compound of claim 1, which is a pharmaceutically acceptable acid addition salt of 3-(1,3,4,9b-tetrahydro-2H-indeno[1,2-c]pyridin-2-yl) - p - methylpropiophenone.

9. The compound of claim 1, which is a pharmaceutically acceptable acid addition salt of 3,(1,3,4,9b-tetrahydro-2H-indeno[1,2-c]pyridin-2-yl) - p - methoxypropiophenone.

10. The compound of claim 1, which is a pharmaceutically acceptable acid addition salt of 1-cyclopentyl-3-(1,3,4,9b-tetrahydro - 2H - indeno[1,2-c]pyridin-2-yl)-1-propanone.

11. The compound of claim 1, which is a pharmaceutically acceptable acid addition salt of 4-(1,3,4,9b-tetrahydro-7-methyl-2H-indeno[1,2-c]pyridin-2-yl)-2-butanone.

12. The compound of claim 1, which is a pharmaceutically acceptable acid addition salt of 3-(1,3,4,9b-tetrahydro-2H-indeno[1,2-c]pyridin-2-yl) - m - methylpropiophenone.

13. The compound of claim 1, which is a pharmaceutically acceptable acid addition salt of 3-(1,3,4,9b-tetrahydro-2H-indeno[1,2-c]pyridin-2-yl) - m - methoxypropiophenone.

14. The compound of claim 1, which is a pharmaceutically acceptable acid addition salt of 3-(1,3,4,9b-tetrahydro-2H-indeno[1,2 - c]pyridin-2-yl)-o-methoxypropiophenone.

15. The compound of claim 1, which is a pharmaceutically acceptable acid addition salt of 3-(1,3,4,9b-tetrahydro-2H-indeno[1,2-c]pyridin-2-yl) - m,p - dimethoxypropiophenone.

16. The compound of claim 1, which is a pharmaceutically acceptable acid addition salt of 3-(1,3,4,9b-tetrahydro-2H-indeno[1,2 - c]pyridin-2-yl) - o,p - dimethoxypropiophenone.

References Cited
UNITED STATES PATENTS 3,591,595   7/1971   Ebnother et al. ____ 260—297 T ALAN L. ROTMAN, Primary Examiner U.S. Cl. X.R.

260—247.5 R, 268 T, 293.69, 295 T, 297 T; 424—248, 250, 266, 267